United States Patent Office 2,741,613
Patented Apr. 10, 1956

2,741,613
N-SUBSTITUTED DIHYDRONORMORPHINONE COMPOUNDS

Robert L. Clark, Woodbridge, N. J., assignor to Merck & Co., Inc., Rahway, N. J., a corporation of New Jersey No Drawing. Application November 22, 1952, Serial No. 322,144

9 Claims. (Cl. 260—285)

This invention is concerned generally with novel derivatives of morphine and with processes for preparing these morphine derivatives. More particularly, it relates to novel N-substituted dihydronormorphinone compounds having attached to the nitrogen atom the terminal carbon of a straight aliphatic chain consisting of three carbon atoms, to lower alkanoyl esters of these N-substituted dihydronormorphinone compounds, to acid salts thereof, and to novel processes for preparing these compounds starting with the corresponding N-substituted dihydronorcodeinone compound. These N-substituted dihydronormorphinone compounds, their esters, and salts thereof, are active as morphine antagonists.

The N-substituted dihydronormorphinone compounds, their esters, and salts thereof, subject of the present invention, may be chemically represented by the following structural formulae:

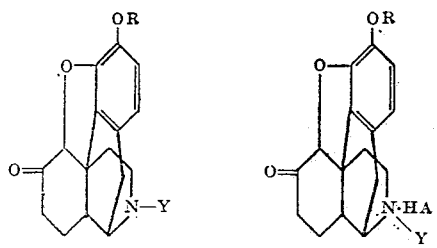

wherein R is hydrogen or a lower alkanoyl radical, Y is an aliphatic radical containing a straight chain consisting of three carbon atoms the terminal carbon of which is attached to the nitrogen atom, and HA is an acid.

The chemical relationship of these N-dihydronormorphinone compounds, and their esters, to morphine is clear from a comparison of the foregoing formulae with the formula for morphine which is as follows:

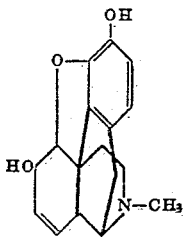

Whereas the alkaloid morphine is a potent analgesic, I have found that N-substituted dihydronormorphinone compounds having attached to the nitrogen atom the terminal carbon of a straight aliphatic chain consisting of three carbon atoms, and, in particular, N-n-propyldihydronormorphinone, N-isobutyldihydronormorphinone, N-allyldihydronormorphinone, N-methallyldihydronormorphinone, the lower alkanoyl esters of these N-substituted dihydronormorphinone compounds, and acid salts thereof, are strong morphine antagonists and prevent or abolish the analgesic action of morphine when utilized in conjunction with that drug. This antagonistic action possessed by the subject compounds is particularly surprising in view of the fact that other N-alkyldihydronormorphinone compounds such as N-methyldihydronormorphinone (i. e. dihydromorphinone), N-n-butyldihydronormorphinone, N-amyldihydronormorphinone and N-hexyldihydronormorphinone, exhibit no appreciable morphine antagonistic activity.

The N-substituted dihydronormorphinone compounds having attached to the nitrogen atom the terminal carbon of a straight aliphatic chain consisting of three carbon atoms, the lower alkanoyl esters of these dihydronormorphinone compounds, and acid salts thereof, can be prepared by reactions which may be chemically represented as follows:

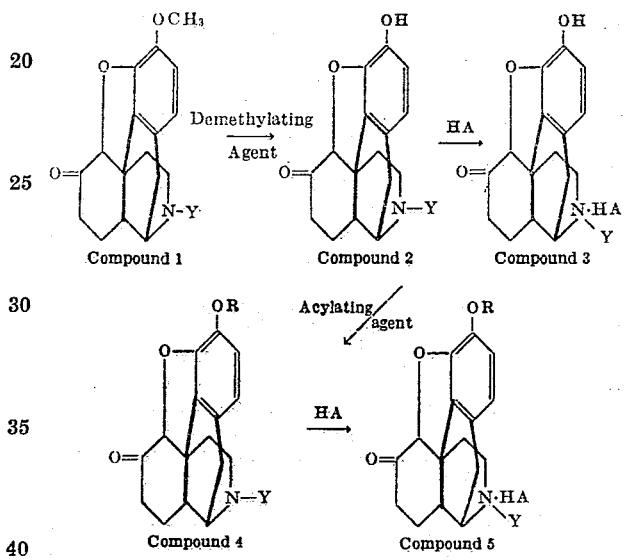

wherein R is a lower alkanoyl radical, Y is an aliphatic radical containing a straight chain consisting of three carbon atoms a terminal carbon of which is attached to the nitrogen atom, and HA is an acid.

The reactions indicated hereinabove are carried out as follows: an N-substituted dihydrocodeinone compound having attached to the nitrogen atom a terminal carbon atom of a straight aliphatic chain consisting of three carbon atoms (Compound 1) is reacted with a demethylating agent, thereby forming the corresponding N-substituted dihydronormorphinone compound (Compound 2); the latter compound is reacted with an acid to produce the corresponding salt of said N-substituted dihydronormorphinone compound (Compound 3); alternatively the N-substituted dihydronormorphinone compound is reacted with a lower alkanoic anhydride thereby producing the corresponding 3-alkanoyl-N-substituted dihydronormorphinone compound wherein the N-substituent is an aliphatic radical containing a straight chain consisting of three carbon atoms a terminal carbon of which is attached to the nitrogen atom (Compound 4), which is converted by reaction with an acid to the corresponding acid salt of the 3-alkanoyl dihydronormorphinone compound (Compound 5).

The N-substituted dihydronorcodeinone compounds, having attached to the nitrogen atom a terminal carbon of a straight aliphatic chain consisting of three carbon atoms, which are used as starting materials in my novel process, are new compounds which can be prepared by reacting the commercially available dihyrocodeinone with cyanogen bromide in chloroform solution to form N-cyanodihydronorcodeinone; heating said N-cyanodihydronorcodeinone with aqueous hydrochloric acid thereby hydrolyzing the nitrile substituent and decarboxylating the resulting N-carboxydihydronorcodeinone to produce dihydronorcodeinone; and reacting the latter compound in ethanol solution with an aliphatic halide in contact with sodium bicarbonate thereby forming the corresponding N-substituted dihydronorcodeinone compound. The aliphatic halides which I use in the aforementioned reaction with dihydronorcodeinone contain a straight aliphatic chain consisting of three carbon atoms the terminal carbon of which is attached to the halogen atom; this aliphatic chain may be unsubstituted or it may have a methyl grouping attached to the middle carbon. I prefer to employ, as the aliphatic halide, an n-propylhalide such as n-propyl bromide, an isobutyl halide such as isobutyl bromide, an allyl halide such as allyl bromide, a methallyl halide such as methallyl bromide, and the like. In accordance with this procedure there are obtained N-substituted dihydronorcodeinone compounds having attached to the nitrogen atom a terminal carbon of a straight aliphatic chain consisting of three carbon atoms which may have a methyl grouping attached to the middle carbon of said chain as, for example, N-n-propyldihydronorcodeinone, N - isobutyldihydronorcodeinone, N - allyldihydronorcodeinone and N - methallyldihydronorcodeinone.

In accordance with the present invention the N-substituted dihydronorcodeinone compound having attached to the nitrogen atom a terminal carbon of a straight aliphatic chain consisting of three carbon atoms is reacted with a demethylating agent whereupon the 3-methyl ether substituent of the N-substituted dihydronorcodeinone compound is converted to a phenolic hydroxyl grouping without substantially affecting other substituents in the molecule thereby forming the corresponding N-substituted dihydronormorphinone compound. I ordinarily employ, as the demethylating agent the salt of a tertiary amine with a strong acid, as, for example, the hydrohalide of a tertiary heterocyclic amine such as pyridine hydrochloride, pyridine hydrobromide, picoline hydrochloride, picoline hydrobromide, quinoline hydrochloride, quinoline hydrobromide, an alkali metal alkoxide such as sodium ethoxide, sodium methoxide, a hydrohalic acid, such as hydrobromic acid, hydroiodic acid, and the like. The demethylation reaction is ordinarily conducted when using a tertiary amine salt by heating the N-substituted dihydronorcodeinone compound with the demethylating agent, at an elevated temperature above about 200° C. I prefer to employ pyridine hydrochloride as the demethylating agent and to carry out the reaction by heating the reactants together at a temperature within the range of about 210–225° C.; under these reaction conditions the demethylation is usually substantially complete after a heating period of approximately ten to fifteen minutes. The reaction mixture is then cooled, made slightly basic with a mildly alkaline aqueous solution such as aqueous ammonium hydroxide and the resulting aqueous mixture extracted with a water-immiscible organic solvent such as ether. Upon evaporation of the organic solvent extract there is obtained the N-substituted dihydronormorphinone compound. The N-substituted dihydronormorphinone compound contains a phenolic hydroxyl grouping and forms a sodium salt which is soluble in water; the N-substituted dihydronormorphinone is thus readily separated from unchanged N-substituted dihydronorcodeinone which may be present since the latter compound is insoluble in aqueous alkaline solutions. In accordance with my novel demethylation procedure there are obtained N-substituted dihydronormorphinone compounds having attached to the nitrogen atom a terminal carbon of a straight aliphatic chain consisting of three carbon atoms which may have a methyl grouping attached to the middle carbon atom of said chain as, for example, N-n-propyl- dihydronormorphinone, N - isobutyldihydronormorphinone, N-allyldihydronormorphinone, and N-methallyldihydronormorphinone.

The N-substituted dihydronormorphinone compound having attached to the nitrogen atom a terminal carbon of a straight aliphatic chain consisting of three carbon atoms is then reacted with a lower alkanoic anhydride such as acetic anhydride, propionic anhydride, and the like, thereby esterifying the hydroxyl radical in the 3-position of the molecule to form the corresponding 3-alkanoyl N-substituted dihydronormorphinone compound having attached to the nitrogen atom the terminal carbon of a straight aliphatic chain consisting of three carbon atoms which may have a methyl grouping attached to the middle carbon atom of said chain, as for example, 3 - acetyl - N - (n - propyl) - dihydronormorphinone, 3 - propionyl - N - (n - propyl) - dihydronormorphinone, 3 - butyryl - N - (n - propyl) - dihydronormorphinone, 3 - acetyl - N - isobutyldihydronormorphinone, 3 - propionyl - N - isobutyldihydronormorphinone, 3 - butyryl - N - isobutyldihydronormorphinone, 3 - acetyl - N - allyldihydronormorphinone, 3 - propionyl - N - allyldihydronormorphinone, 3 - butyryl - N - allyldihydronormorphinone, 3 - acetyl - N - methallyldihydronormorphinone, 3 - propionyl - N - methallyl - dihydronormorphinone, 3 - butyryl - N - methallyldihydronormorphinone, and the like.

The reaction between the alkanoic acid anhydride and the N-substituted dihydronormorphinone compound is ordinarily conducted by heating a mixture of the reactants to a temperature of about 100° C. for a period of about two or to three hours. The reaction mixture is then evaporated under reduced pressure, and the residual material is purified by recrystallization from a lower alkanol such as ethanol to give the 3-alkanoyl-N-substituted dihydronormorphinone compound in substantially pure form.

The conversion of the N-substituted dihydronormorphinone compounds, or their lower alkanoyl esters, the 3-alkanoyl-N-substituted dihydronormorphinone compounds, to the corresponding acid salts is ordinarily conducted by reacting the N-substituted dihydronormorphinone compound or the 3-alkanoyl-N-substituted dihydronormorphinone compound, under substantially anhydrous conditions, with an acid, as for example, hydrogen chloride, hydrogen bromide, sulfuric acid, acetic acid, tartaric acid, citric acid, and the like. This salt-forming reaction is conveniently carried out by dissolving the N-substituted dihydronormorphinone compound, or the 3-alkanoyl-N-substituted dihydronormorphinone compound, in a hot lower alkanol, such as ethanol, methanol, propanol, and the like, and adding to the solution a slight excess of an alcoholic solution of the appropriate acid. Upon diluting the resulting alcoholic medium with an alcohol-miscible non-solvent for the product, such as diethyl ether, there crystallizes from the mixture (depending on whether the N-substituted dihydronormorphinone, or its ester, is used as starting material) the acid salt of the N-substituted dihydronormorphinone compound or the acid salt of the 3-alkanoyl-N-substituted dihydronormorphinone, such as N-n-propyldihydronormorphinone hydrochloride, N-n-propyldihydronormorphinone hydrobromide, N-n-propyldihydronormorphinone sulfate, N-n-propyldihydronormorphinone acetate, N - n - propyldihydronormorphinone tartrate, N-isobutyldihydronormorphinone hydrochloride, N-isobutyldihydronormorphinone hydrobromide, N-isobutyldihydronormorphinone sulfate, N-isobutyldihydronormorphinone acetate, N-isobutyldihydronormorphinone tartrate, N - allyldihydronormorphinone hydrochloride, N-allyldihydronormorphinone hydrobromide, N-allyldihydronormorphinone sulfate, N-allyldihydronormorphinone acetate, N-allyldihydronormorphinone tartrate, N - methallyldihydronormorphinone hydrochloride, N - methallyldihydronormorphinone hydrobromide, N - methallyldihydronormorphinone sulfate, N-methallyldihydronormorphinone tartrate, 3-acetyl-N-(n-propyl)-dihydronormorphinone hydrochloride, 3 - acetyl-N-(n-propyl)-dihydronormorphinone hydrobromide, 3-acetyl-N-(n-propyl)-dihydronormorphinone sulfate, 3-acetyl-N-(n-propyl)-dihydronormorphinone acetate, 3-acetyl-N-(n-propyl)-dihydronormorphinone tartrate, 3-propionyl-N-(n-propyl)-dihydronormorphinone hydrochloride, 3 - propionyl - N - (n-propyl)-dihydronormorphinone hydrobromide, 3-propionyl-N-(n-propyl)-dihydronormorphinone sulfate, 3-propionyl-N-(n-propyl)-dihydronormorphinone acetate, 3-butyryl-N-(n-propyl) - dihydronormorphinone hydrochloride, 3-butyryl-N-(n-propyl)-dihydronormorphinone hydrobromide, 3-butyryl-N-(n-propyl)-dihydronormorphinone sulfate, 3-butyryl-N-(n-propyl)-dihydronormorphinone tartrate, 3 - acetyl - N - isobutyldihydronormorphinone hydrochloride, 3-acetyl-N-isobutyldihydronormorphinone hydrobromide, 3-acetyl-N-isobutyldihydronormorphinone sulfate, 3-acetyl-N-isobutyldihydronormorphinone tartrate, 3-acetyl-N-isobutyldihydronormorphinone acetate, 3-propionyl-N-isobutyldihydronormorphinone hydrochloride, 3-propionyl-N-isobutyldihydronormorphinone hydrobromide, 3-propionyl-N-isobutyldihydronormorphinone sulfate, 3-propionyl-N-isobutyldihydronormorphinone tartrate, 3-butyryl-N-isobutyldihydronormorphinone hydrochloride, 3-butyryl-N-isobutyldihydronormorphinone hydrobromide, 3-butyryl-N-isobutyldihydronormorphinone sulfate, 3-butyryl-N-isobutyldihydronormorphinone acetate, 3-acetyl-N-allyldihydronormorphinone hydrochloride, 3-acetyl-N-allyldihydronormorphinone hydrobromide, 3-acetyl-N-allyldihydronormorphinone sulfate, 3-acetyl-N-allyldihydronormorphinone acetate, 3-acetyl-N-allyldihydronormorphinone tartrate, 3-propionyl-N-allyldihydronormorphinone hydrochloride, 3-propionyl-N-allyldihydronormorphinone hydrobromide, 3-propionyl-N-allyldihydronormorphinone sulfate, 3-propionyl-N-allyldihydronormorphinone acetate, 3-butyryl-N-allyldihydronormorphinone hydrochloride, 3-butyryl-N-allyldihydronormorphinone hydrobromide, 3-butyryl-N-allyldihydronormorphinone sulfate, 3-butyryl-N-allyldihydronormorphinone tartrate, 3-acetyl-N-methallyldihydronormorphinone hydrochloride, 3-acetyl-N-methallyldihydronormorphinone hydrobromide, 3 - acetyl - N - methallyldihydronormorphinone sulfate, 3-acetyl-N-methallyldihydronormorphinone acetate, 3-acetyl-N-methallyldihydronormorphinone tartrate, 3-propionyl-N-methallyldihydronormorphinone hydrochloride, 3-propionyl-N-methallyldihydronormorphinone hydrobromide, 3 - propionyl - N - methallyldihydronormorphinone sulfate, 3-propionyl-N-methallyldihydronormorphinone acetate, 3-butyryl-N-methallyldihydronormorphinone hydrochloride, 3-butyryl-N-methallyldihydronormorphinone hydrobromide, 3-butyryl-N-methallyldihydronormorphinone sulfate, 3-butyryl-N-methallyldihydronormorphinone tartrate, and the like. The salt thus formed is recovered from the alcoholic slurry by filtration or centrifugation.

The following examples illustrate methods of carrying out the present invention, but it is to be understood that these examples are given for purposes of illustration and not of limitation.

*Example 1*

A mixture of 2 g. of N-allyldihydronorcodeinone and 6 g. of pyridine hydrochloride was heated at a temperature of about 225° C. for a period of approximately eleven minutes. The reaction mixture was cooled and to the cooled mixture was added about 25 ml. of water and a small volume of ether. The pH of the resulting mixture was adjusted to about 8 by the addition of an aqueous solution of ammonium hydroxide. The resulting slightly basic mixture was extracted with five portions of ether, and the ethereal extracts were combined. The resulting ethereal solution was washed with water, dried over magnesium sulfate, and evaporated to dryness under reduced pressure. The residual oily material was redissolved in ether and the ethereal solution was extracted with a dilute aqueous solution of sodium hydroxide having a normality of approximately 0.5. The aqueous alkaline extract was acidified with aqueous hydrochloric acid and adjusted to a pH of about 8 by the addition of aqueous ammonium hydroxide. The slightly basic aqueous solution was extracted with ether and the ether was evaporated from the ethereal extract under reduced pressure. The residual oil was crystallized from ethyl acetate and recrystallized from ethyl acetate to give substantially pure N-allyldihydronormorphinone; M. P. 212–216° C.; $[\alpha]_D^{25} = -200°$; (C, 0.5 in absolute ethanol). *Anal.*—calc'd for $C_{19}H_{21}NO_3$: C, 73.28; H, 6.80; N, 4.50. Found: C, 73.43; H, 6.86; N, 4.41.

The N-allyldihydronorcodeinone utilized as starting material in the foregoing process may be prepared in accordance with the following three-step procedure: (1) A solution of 12 g. of dihydrocodeinone in 25 ml. of dry chloroform is added, dropwise with stirring, over a one and one-half hour period, to a solution of 4.9 g. of cyanogen bromide in 15 ml. of dry chloroform. The resulting solution is heated under reflux for an additional period of one hour, and the reaction mixture is diluted with about 300 ml. of ether. The white solid material which precipitates is recovered by filtration and slurried with about 35 ml. of absolute ethanol for a period of about one hour. The insoluble material is recovered from the alcoholic slurry by filtration, and purified by recrystallization from absolute ethanol to give substantially pure N-cyanodihydronorcodeinone; M. P. 217–218° C.

(2) A mixture of 26.3 g. of N-cyanodihydronorcodeinone, 85 ml. of glacial acetic acid, 30 ml. of concentrated aqueous hydrochloric acid, and 600 ml. of distilled water is heated to a temperature of about 90–92° C. and maintained at that temperature for a period of about forty-eight hours. The amber-colored reaction solution is filtered through a mat of activated charcoal thereby decolorizing said solution. The colorless filtered solution is cooled and to the cold solution is added 100 g. of ice and 200 ml. of aqueous ammonium hydroxide solution. The resulting solution is extracted with four portions of chloroform, the chloroform extracts are combined, and the resulting chloroform solution is dried over magnesium sulfate. The dry chloroform solution is evaporated under reduced pressure, and the residual crystalline material is washed with ether and recrystallized from ethyl acetate to give substantially pure dihydronorcodeinone; M. P. 144–147° C.

(3) A mixture of 1 g. of dihydronorcodeinone, 0.42 g. of allyl bromide, 0.42 g. of sodium bicarbonate and 15 ml. of absolute ethanol is heated under reflux, with stirring, for a period of approximately six hours. The reaction mixture is evaporated to dryness under reduced pressure, the residual material is extracted twice with hot chloroform and the chloroform extracts are combined. The resulting chloroform solution is filtered through a pad of diatomaceous silica, and the filtered chloroform solution is evaporated to dryness under reduced pressure to give N-allyldihydronorcodeinone which is obtained in the form of a gummy residue. The latter material can be purified, if desired, by dissolving the gummy material in an alcoholic solution of tartaric acid, and allowing the resulting alcoholic solution to stand whereupon a crystalline product precipitates. This crystalline material is recovered by filtration and recrystallized from hot absolute ethanol and dried at 78° C. in vacuo to give, in substantially pure form, the monohydrate of N-allyldihydronorcodeinone tartrate; M. P. 103–104° C.

*Example 2*

Six grams of pyridine hydrochloride were dried in vacuo at a temperature of approximately 100° C. The dry pyridine hydrochloride was then heated to a temperature of approximately 225° C. and to the molten pyridine hydrochloride thus obtained was added 1.9 g. of N-n-propyldihydronorcodeinone hydrobromide. The resulting molten mixture was heated at a temperature of about 225° C. for a period of approximately fifteen minutes. The reaction mixture was cooled, diluted with water, and a sufficient volume of ether was added to form a layer on top of the aqueous mixture. To the resulting mixture was added about 100 mg. of sodium hydrosulfite which inhibited oxidation of the phenolic substitutent in the demethylated reaction product. The resulting aqueous-ethereal mixture was adjusted to a pH of approximately 8 by the addition of aqueous ammonium hydroxide solution, and the resulting slightly basic aqueous mixture was extracted with five portions of ether. The ethereal extracts were combined, and the resulting ethereal solution was dried over magnesium sulfate, and the ether evaporated therefrom under reduced pressure. The residual oily material was triturated with ether and the amorphous precipitate which formed was recovered by filtration and crystallized from ethyl acetate to give substantially pure, crystalline N-n-propyldihydronormorphinone; M. P. 214–216° C.; $[\alpha]_D^{25} = -154.5°$ (C, 0.6 in absolute ethanol). Anal.—Cac'd for $C_{19}H_{23}O_3N$: C, 72.83; H, 7.40. Found: C, 72.76; H, 7.70.

The N-n-propyldihydronorcodeinone hydrobromide utilized as starting material in the foregoing process can be prepared in accordance with the following procedure:— A mixture of 3 g. of dihydronorcodeinone (which can be prepared as set forth under the heading of Example 1 hereinabove), 1.34 g. of sodium bicarbonate, 1.88 g. of N-propyl iodide and 37 ml. of absolute ethanol is heated under reflux, with stirring, for a period of about thirty hours. At the end of this period, the ethanolic reaction mixture is cooled and filtered. The filtered alcoholic solution is evaporated to dryness under reduced pressure and the residual material is extracted with three portions of hot chloroform. The chloroform extracts are combined, and the resulting chloroform solution is evaporated to dryness. The residual material is dissolved in a slight excess of ethanolic hydrogen bromide, and the crystalline material which separates is recrystallized several times from methanol to give substantially pure N-n-propyldihydronorcodeinone hydrobromide.

*Example 3*

A mixture of 1.6 g. of N-methallyldihydronorcodeinone tartrate and 5 g. of pyridine hydrochloride was heated at a temperature of approximately 215–220° C. for a period of about twelve minutes. The cooled reaction mixture was diluted with water, made slightly alkaline with ammonium hydroxide and extracted with three portions of diethyl ether. The ether extracts were combined and the ethereal solution was extracted with 1 N aqueous sodium hydroxide solution. The aqueous extract was neutralized with aqueous hydrochloric acid, and the resulting aqueous solution was extracted with ether. The ethereal extract was washed with water, dried over magnesium sulfate and the ether evaporated under reduced pressure to give N-methallyldihydronormorphinone which was obtained in the form of an oil. This residual oil was dissolved in an ethanolic solution of tartaric acid, and the crystalline material which separated on cooling the solution was recovered by filtration and recrystallized from ethanol to give, in substantially pure form, the monohydrate of N-methallyldihydronormorphinone tartrate; M. P. 119–124° C., $[\alpha]_D^{25} = -97°$ (C, 0.8 in absolute ethanol). Analysis.—calc'd for $C_{20}H_{24}NO_3 \cdot C_4H_6O_6 \cdot \frac{1}{2}H_2O$: C, 59.50; H, 6.24. Found: C, 59.31; H, 6.67.

The N-methallyldihydronorcodeinone tartrate utilized as starting material in the foregoing process was prepared in accordance with the following procedure: A mixture of 4 g. of dihydronorcodeinone (which can be prepared as set forth under the heading of Example 1 hereinabove), 1.78 g. of sodium bicarbonate, 1.35 g. of methallyl chloride and 75 ml. of absolute ethanol was heated under reflux with stirring for a period of about seventy hours. The reaction mixture was filtered while hot, and the filtered alcoholic solution was evaporated to dryness under reduced pressure. The residual oily material was extracted with three portions of petroleum ether, and the combined extracts were evaporated to dryness. The residual material was dissolved in 5 ml. of warm absolute ethanol and the solution was added to a warm alcoholic solution of tartaric acid. The fine cotton-like crystalline material which precipitated upon cooling the solution was recovered by filtration and recrystallized from an aqueous ethanol solution (6 parts ethanol to 1 part of water) to give, in substantially pure form, the monohydrate of N-methallyldihydronorcodeinone tartrate; M. P. 88–92° C.

*Example 4*

When a mixture of about 1 part of N-isobutyldihydronorcodeinone and 3 parts of pyridine hydrochloride are heated at a temperature of about 215–220° C. for a period of about 10–15 minutes and the reaction mixture treated substantially as described in Example 3 hereinabove there is obtained N-isobutyldihydronormorphinone. Upon reacting this material with alcoholic tartaric acid solution, there is obtained the monohydrate of N-isobutyldihydronormorphinone tartrate.

The N-isobutyldihydronorcodeinone tartrate utilized as starting material in the foregoing process can be prepared in accordance with the following procedure: A mixture of 4 g. of dihydronorcodeinone, 1.78 g. of sodium bicarbonate, 75 ml. of absolute ethanol and 2.75 g. of isobutyl iodide is heated under reflux with stirring for a period of about seventy hours. The reaction mixture is filtered while hot and the alcoholic filtrate is evaporated to dryness under reduced pressure. The residual material is extracted with chloroform, and the chloroform is evaporated from the chloroform extract to give a residual oil. The residual oil is triturated with ether and the crystalline N-isobutyldihydronorcodeinone (M. P. 95° C.) thus obtained is dissolved in a small volume of absolute ethanol and added to an ethanolic solution of tartaric acid. The crystalline material which precipitates upon chilling the alcoholic solution is recovered and recrystallized from ethanol to give, in substantially pure form, a hydrated N-isobutyldihydronorcodeinone tartrate; M. P. 98–100° C.

Various changes and modifications may be made in carrying out the present invention without departing from the spirit and scope thereof. Insofar as these changes and modifications are within the purview of the annexed claims, they are to be considered as part of my invention.

I claim:

1. A compound selected from the group which consists of N-substituted dihydronormorphinone compounds having attached to the nitrogen atom a radical selected from the group consisting of N-n-propyl, N-isobutyl, N-allyl and N-methallyl radicals, lower alkanoyl esters of said N-substituted dihydronormorphinone compounds, and acid addition salts thereof.

2. N-n-propyldihydronormorphinone.

3. N-n-propyldihydronormorphinone hydrochloride.

4. 3-acetyl-N-(n-propyl)-dihydronormorphinone sulfate.

5. N-allyldihydronormorphinone.

6. N-allyldihydronormorphinone sulfate.

7. The process which comprises reacting a demethylating agent with an N-substituted dihydronorcodeinone compound having attached to the nitrogen atom a radical selected from the group consisting of N-n-propyl, N-isobutyl, N-allyl and N-methallyl radicals, thereby forming the corresponding N-substituted dihydronormorphinone compound.

8. The process which comprises reacting pyridine hydrochloride with N-n-propyldihydronorcodeinone to produce N-n-propyldihydronormorphinone.

9. The process which comprises reacting pyridine hydrochloride with N-allyldihydronorcodeinone to produce N-allyldihydronormorphinone.

References Cited in the file of this patent

UNITED STATES PATENTS

| | | |
|---|---|---|
| 2,178,010 | Small | Oct. 31, 1939 |
| 2,203,121 | Zutavern | June 4, 1940 |

OTHER REFERENCES

Small: J. Org. Chem., vol. 3, p. 213.